July 2, 1929.  E. LE V. FOGLAND  1,719,006
WINDSHIELD WIPER
Filed Sept. 14, 1928
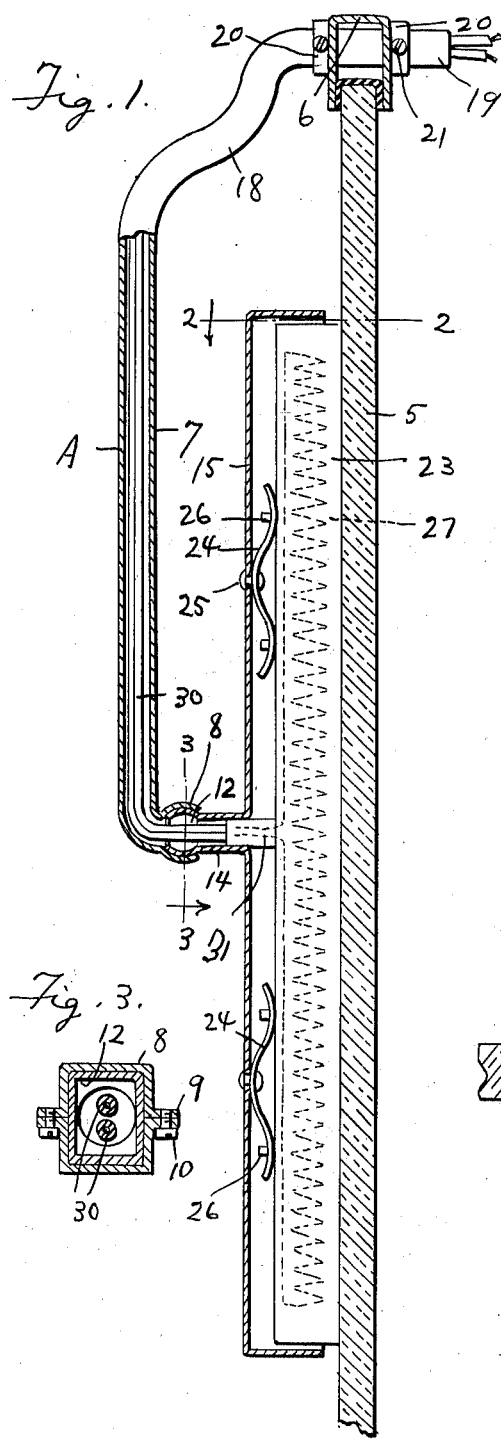
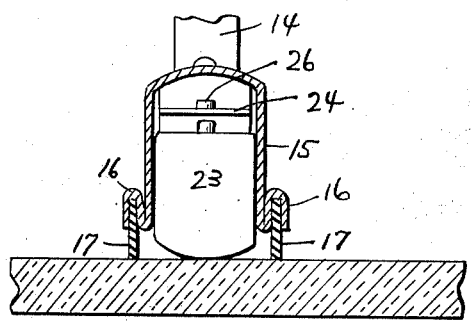
Inventor
Emil Le Verne Fogland
By Clarence A. O'Brien
Attorney Patented July 2, 1929.

1,719,006

UNITED STATES PATENT OFFICE.

EMIL LE VERNE FOGLAND, OF KEARNEY, NEBRASKA.

WINDSHIELD WIPER.

Application filed September 14, 1928. Serial No. 306,001.

The present invention relates to improvements in windshield wipers and has for its prime object to provide a device of this character, which is provided with a heating element, and means to operate the wiper and heating element in freezing water and especially during sleet storms, so as to be efficient in keeping the vision through the windshield clear.

Another very important object of the invention is the production of a simple device, whereby heat may be radiated against the surface of the windshield, so as to permit the wiper to successfully operate in a free manner.

A still further very important object of the invention resides in the provision of a windshield wiper of this nature which is comparatively simple in its construction, inexpensive to manufacture, strong and durable, thoroughly efficient and reliable in its operation, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawings:

Figure 1 is a side view of a windshield wiper constructed in accordance with my invention, showing the portions thereof in section.

Figure 2 is a sectional view, taken substantially on the line 2—2 of Figure 1.

Figure 3 is an enlarged detail section, taken substantially on the line 3—3 of Figure 1.

Referring to the drawing in detail, it will be seen that the numeral 5 denotes a windshield. This windshield 5 is mounted in a frame, the top rail of which is indicated by the numeral 6. A hollow arm A includes an elongated straight intermediate portion 7 merging at one end into a laterally disposed socket like extension 8 split and provided with ears 9, with which fastening elements 10 may be engaged for holding the socket about a similarly shaped member 12, formed on a tubular shank 14, at the center of an elongated casing 15 that is open on one side remote from the tubular shank 14.

The longitudinal edges of this casing adjacent the open side is provided with clamp flanges 16 to receive squeegee elements 17. At the other end, the elongated straight intermediate portion 7 of the arm A merges into an ogee shaped curved portion 18, terminating in a trunnion 19 at right angles to the intermediate portion 7 and journaled through an opening in the frame 6 and having inner and outer collars 20 mounted thereon by set screws 21, so as to hold the trunnion against displacement from the same. This trunnion will be rocked by any suitable or conventional means.

A housing 23 is of elongated construction and is mounted in the casing 15 by means of leaf springs 24, anchored intermediate their ends to the top wall of the casing 15 as at 25 and having studs 26 projecting through the end portions thereof, said studs being mounted on the inner side or rear side of the housing 23. An electric heating element 27 is mounted in the rear side of the housing 23 and the electric leads 30 thereof extend through a tube 31 projecting from the housing 23 and slidable in the tubular shank 14 and through the shank 14, through the member 12 and associated socket 8 and through the arm A to a suitable source of electrical energy. The front wall of the housing is convexed outwardly for engaging the front surface of the windshield as the wiper moves back and forth in an oscillating manner.

It is thought that the construction, utility, operation, and advantages of this invention will now be quite apparent to those skilled in this art without a more detailed description thereof. The present embodiment of the invention has been disclosed in considerable detail, merely for the purposes of exemplification, since in actual practice it attains the features of advantage enumerated as desirable in the statement of the invention and the above description.

It will be apparent that changes in the details of construction, and in the combination and arrangement of parts may be resorted to, without departing from the spirit of the invention or the scope of the appended claims.

Having thus described by invention, what I claim as new is:

1. A windshield wiper of the class described including an oscillating arm of hollow construction formed with an elongated straight intermediate portion merging at one end into an offset portion terminating in a trunnion, the other end of the intermediate portion merging into a socket laterally disposed thereto, a casing having a hollow shank projecting therefrom and merging into a member terminating in the socket to provide a flexible connection between the casing and the arm, squeegee means on the casing, an electrically heated element in the casing having wires leading therefrom through the hollow arm, said member and socket being shaped similarly to prevent twisting motion of one with respect to the other, spring means in the casing to urge the electrically heated elements against the windshield, said element comprising a housing with electrical heating means therein, and the wall engaging the windshield being convexed toward the windshield.

2. A windshield wiper of the class described including an oscillating arm of hollow construction one end of which merges into a socket laterally disposed thereto, a casing having a hollow shank projecting therefrom and merging into a member terminating in the socket so as to provide a flexible connection between the casing and the arm, squeegee means on the casing, and an electrically heated element in the casing having wires leading through said flexible connection and said hollow arm.

3. A windshield wiper of the class described including an oscillating arm of hollow construction one end of which merges into a socket laterally disposed thereto, a casing having a hollow shank projecting therefrom and merging into a member terminating in the socket so as to provide a flexible connection between the casing and the arm, squeegee means on the casing, and an electrically heated element in the casing having wires leading through said flexible connection and said hollow arm, said member and said socket being shaped similarly to prevent twisting motion of one with respect to the other.

4. A windshield wiper of the class described including an oscillating arm of hollow construction one end of which merges into a socket laterally disposed thereto, a casing having a hollow shank projecting therefrom and merging into a member terminating in the socket so as to provide a flexible connection between the casing and the arm, squeegee means on the casing, and an electrically heating element in the casing having wires leading through said flexible connection and said hollow arm, said member and said socket being shaped similarly to prevent twisting motion of one with respect to the other, and spring means in the casing to urge the electrically heated element against the windshield.

In testimony whereof I affix my signature.

EMIL LE VERNE FOGLAND.